United States Patent [19]
Balsacq

[11] 3,856,743
[45] Dec. 24, 1974

[54] ANTI-FOULING POLYESTER RESIN
[76] Inventor: Guy Balsacq, "Hucheloup" Kersoulard en Crach, 56400 Auray, France
[22] Filed: June 5, 1973
[21] Appl. No.: 367,182

[30] Foreign Application Priority Data
June 19, 1972 France .............................. 72-21956

[52] U.S. Cl.. 260/40 R, 260/45.75 K, 260/45.75 C, 260/45.75 R, 260/860 R
[51] Int. Cl... C08g 51/24, C08g 51/56, C08g 51/62
[58] Field of Search ........ 260/29.1 B, 40 R, 860 R, 260/45.75 K, 45.75 C, 45.75 R; 106/15 AF

[56] References Cited
UNITED STATES PATENTS

| 3,188,363 | 6/1965 | Amidon et al. | 260/45.75 |
|---|---|---|---|
| 3,308,082 | 3/1967 | Pauli et al. | 260/45.75 |
| 3,446,766 | 5/1966 | Taylor | 260/22 |
| 3,615,744 | 10/1971 | Yokoo et al. | 106/15 |
| 3,696,071 | 10/1972 | Dementi | 260/45.75 |
| 3,717,606 | 2/1973 | Lomasney | 260/40 |
| 3,789,030 | 1/1974 | Volgstadt et al. | 260/40 |

Primary Examiner—V. P. Hoke
Attorney, Agent, or Firm—Wenderoth, Lind & Ponack

[57] ABSTRACT

A non-corrosive anti-fouling polymerisable composition for coating or forming a structure to be immersed in water and subject to infestation of aquatic flora and fauna characterized in that it comprises a polyester resin based upon isophthalic, orthophthalic, tetrahydrophthalic or terephthalic acid and up to 25% by weight based on resin content of a toxic agent which is a cupric, mercuric or stannic compound or a mixture thereof, and optionally sufficient colloidal silica to produce a gel.

6 Claims, No Drawings

ANTI-FOULING POLYESTER RESIN

BACKGROUND TO THE INVENTION

As far as the construction of boats is concerned, for example, the use of polyester resins has already offered an advantage in itself, for steadfastness of this material or coating in water is clearly superior to that of other traditional materials such as for example wood or steel.

However, whilst resistance to corrosion of this material is satisfactory, it does not in any case prevent the onslaught of biological fouling, which remains as intense as ever and necessitates constant maintenance.

Thus, there have already been developed coating compositions amongst which gelled coating have assumed increasing importance. What is meant here is a mixture of resin with an appropriate quantity of colloidal silica.

Nevertheless, such gelled coating have frequently to be protected by anti-fouling paints, for they do not prevent the deposition of animal and vegetable fouling growing in water.

Likewise, it has already been proposed to use copper or copper salts to form protective coatings for hulls and bodyworks. Thus, the coating known as "bronze bottom" serving to protect boat hulls, (anti-fouling coating) has chiefly become known.

Likewise, agents for protecting plastics material against organisms growing under water have likewise become known.

Thus, French Patent No. 1,529,350 has proposed, as an agent for protection against the multiplication of animal or vegetable organisms growing under water, a mixture containing copper (II) oxide, zinc oxide and mercuric oxide mixed with a filmogene made up, for example, of polythylene wax, the solvent being composed of perchloroethylene containing substances imparting consistency and capable of being polished. Apart from this latter process, applicable only to stratified substances, none of the aforementioned agents offers the qualities of durability required to avoid delicate repairs to hulls or bodyworks which they must, in principle, protect.

Since, on the one hand, a relatively thin film of coating applied to an immersed material does not offer sufficient resistence to ensure satisfactory protection against corrosion, environmental animal organism and vegetable organism, it is now proposed to impart anti-fouling properties directly to the resin for coating or constituting the immersed object.

On the other hand, the toxicity of copper salts, suggested that it would be possible to incorporate them in a gelled coating to inhibit or prevent the onslaught of fouling on immersed materials, for example, on bodyworks and hulls of boats. However, after exhaustive studies not only in the laboratory but also in practice it has been found that the only usable copper salts are cupric salts, since the metal is in its highest oxidation state.

This invention relates to anti-fouling compositions for protecting or forming material objects to be immersed in fresh water or in seawater against corrosion and attack by environmental fauna and flora organisms.

The object of the invention is to provide a coating and protective resin having anti-corrosion and anti-fouling properties, and it is characterised by the fact that it is composed of a polyester resin to which is added before polymerization appropriate agents having a toxic effect on animal or vegetable organisms living under the water, this toxic effect having little polluting influences and being of long duration.

Preferably, the toxic agent incorporated before polymerization in the polyester resin is composed of a cupric, mercuric, or stannic salt, or a mixture of these salts, in which the metal in high valency state, that is to say the metal is at its maximum degree of oxidation.

It is further preferred that the polyester resin contains up to 25% of cupric, mercuric, or stannic salts, e.g., from 15% to 25%.

The invention also includes a process for protecting immersed materials or structures against animal or vegetable organisms developing in the water, which consists of coating these materials or structures with a suitably thick layer of a polyester resin, to which had been added before polymerization, by an appropriate quantity of a toxic agent for the organism in question, more especially 25% of cupric, mercuric, or stannic salts, and optionally contained colloidal silica serving to form a gelled coating.

Other characteristics and advantages of this invention will become clearer from the description which follows, in which there are indicated by way of example, some applications of the anti-fouling polyester resins according to the invention.

The experiments carried out by the Applicant have been those by polyester resin used by, for example, be those marketed by Messrs. Peghiney-Saint-Gobain under the name of "STRATYL A 116" (Trade Mark), using for methylethylcetone peroxide diluted to 50% with methylphthalate, for the polymerization and using also, as accelerator, a cobalt naphthanate at 6% metal. Methylethycetone peroxide of the formula:

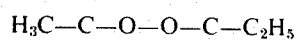

$$H_3C-C-O-O-C-C_2H_5$$

gives a more rapid gelification than benzoyl peroxide, but a more regular and steady hardening and consequently, a smoother polymerization. The cobalt naphthenate (6%) for its part, permits polymerization at ambient temperature.

The influences of the presence of a cupric, mercuric, or stannic salt upon polymerization was examined using only salts in which the metal is at its maximum degree of oxidation.

From the tests carried out, in particular on the proportions of active oxygen in the catalyst in the presence of the said metal salts, and on the conditions of gelification and hardening of the resin, it has been found that incorporation of the specified toxic metal salts with anti-fouling action does not impair in any way the qualities of the resin into which they are incorporated.

In practice, tests have been carried out in the English Channel from the end of the month of May to the beginning of the month of November, a period which corresponds, chiefly in the Contentin region, to the period of full development of marine algae.

Tests have been carried out at different depths of immersion varying from 0.02 to 1.30 m, using samples of salts and mixtures of salts indicated hereinafter incorporated in test tubes, the properties of which have been subsequently checked.

Thus, it has been possible to use individually hydrated copper sulphate, cupric carbonate, cupric silicate, cupric acetate, basic cupric acetate, cupric formate, copper thiocyanate and copper aceto-arsenite (Schweinfurth green).

As far as mixtures are concerned, one can use, on the one hand, a mixture composed of three parts mercuric arsenate, nine parts copper aceto-arsenite and nine parts copper thiocyanate as the toxic agent or a mixture similar to the preceding, but in which the copper thiocyanate is replaced by the same quantity of mercuric acetate.

It is equally possible at low concentrations to replace the mercuric arsenate by mercuric chloride.

The cupric silicate used was prepared in the absence of a commercial product, directly from one of the constituents of the gelled coating, namely colloidal silica, by heating an aqueous suspension of the latter with basic copper acetate, the pH being adjusted by the addition of a suitable quantity of an aqueous solution of ammonia. A suitable composition for the preparation of the cupric silicate is 100 grammes of colloidal silica and 200 grammes of basic copper acetate, with an addition of ammonia in quantity ensuring a basic pH with a value of 8 to 9. It is baked for the purpose of drying.

Tests show that a variable selectivity of the animal and vegetable species attached to the immersed anti-fouling polyester resin can be observed.

The most remarkable results are obtained with cupric silicate, cupric acetate and basic copper acetate added in a quantity of at least 15% and preferably 25%.

Before being incorporated in the resin, the toxic salt has to be dried and baked, and above all, be in a finely divided form.

The toxic salt powder is intimately mixed with the colloidal silica, and the whole is incorporated in the resin before polymerization.

Protection tests have been carried out with resins other than the product known as "STRATYL A 116," which is an orthophthalic resin; and it is evident from these tests that isophthalic resins exhibit superior resistance to that of orthophthalic, tetrahydrophthalic and terephthalic polyester resins in relation to sea mist, bad weather, and both continuous and intermittent immersion. They are therefore preferable in the manufacture of the gelled coating, since the "anti-fouling" protection can be achieved with the aid of isophthalic resins which are polymerizable with the same catalysts systems as orthophthalic resins.

The anti-fouling resins according to the invention permit anti-fouling protection of the most varied objects to be considered, whether it is a question, as has already been indicated, of hulls and bodyworks of boats, immersed structures and the like, such as lock gates and grilles.

The invention also includes articles composed of or clad with anti-fouling polyester resins to which have been added, before polymerization, from 15 to 25% of cupric salts, and more especially cupric silicate constituting optimal association with the colloidal silica incorporated, to give the best possible surface polish to polyester resins strengthened with glass fibres or tissues or the like ("mat").

When it is a question of protecting a metallic surface, the invention provides for the layer of resin or coating agent to be brought onto a layer with a base which is electrically non-conductive and adheres it to the metallic surface to be protected in order to avoid the formation of electrolytic cells between the substratum and the resin or coating agent.

The base is advantageously non-conductive and is composed, for example, of a suitably thick layer of an epoxy resin.

It goes without saying that the invention has been described only by way of explanatory example, and that variations are possible in the composition of the resin charged or uncharged with colloidal silica. Also, if colouring pigments are chosen which are compatible with the selected toxic salts, it is possible to incorporate them in order to obtain various colours.

I claim:

1. A composition for use in coating and forming articles to be protected from infestation by aquatic flora and fauna consisting essentially of at least one polymerizable polyester resin derived from phthalic acid, said phthalic acid being selected from the group consisting of isophthalic acid, orthophthalic acid, tetrahydrophthalic acid, terephthalic acid and mixtures thereof; at least one member of the group consisting of cupric, mercuric and stannic salts in a finely divided physical state in an amount of from 15% to 25% by weight, based on the resin content and a gelling amount of colloidal silica.

2. A composition as claimed in claim 1 in which the cupric salt is selected from the group consisting of cupric sulphate, cupric carbonate, cupric formate, cupric thiocyanate and copper aceto-arsenate.

3. A composition according to claim 1 wherein the polyester resin is derived from isophthalic acid.

4. A composition according to claim 1 wherein the polyester resin is derived from orthophthalic acid.

5. A composition according to claim 1 in which the salt is a cupric salt.

6. A composition according to claim 1 in which the salt is a mercuric salt.

* * * * *